United States Patent Office 3,621,737
Patented Nov. 23, 1971

3,621,737
OIL PRESSURE CONTROL SYSTEM FOR FLUID TYPE TRANSMISSION SYSTEM
Sumio Uozumi, Toyota-shi, Japan, assignor to Toyota Jidosha Kogyo Kabushiki Kaisha, Toyota-shi, Aichi-ken, Japan
Filed July 28, 1969, Ser. No. 845,138
Claims priority, application Japan, July 31, 1968, 43/53,588
Int. Cl. B60k 21/08
U.S. Cl. 74—868                 4 Claims

ABSTRACT OF THE DISCLOSURE

This invention provides an oil pressure control system used for fluid type transmission consisting of a torque converter and a speed change gear provided with servo mechanisms. Over the broad range of the servo mechanism, not only the oil pressure controlled by oil pressure control valve but also the oil pressure corresponding to the engine throttle valve opening or vacuum pressure of the intake manifold is supplied by a separate circuit to the servo mechanism, so as to control the oil pressure control valve in accordance with the vehicle speed for relieving the impact at the automatic shift with the aid of appropriate servo capacity.

---

This invention relates to an oil pressure control system for a fluid type automatic transmission for motor vehicles.

An object of this invention is to provide an oil pressure control system for a fluid type automatic transmission consisting of a fluid drive torque converter and a speed change gear equipped with a servo mechanism, which comprises directly furnishing, through a separate circuit, the oil pressure controlled by a pressure control valve and the oil pressure controlled in accordance with the amount of engine throttle valve opening or intake manifold vacuum to the servo mechanism designed to operate within a wide range of torque converter speed ratio, from a low speed ratio demanded in starting the motor vehicle to a high speed ratio demanded during normal operation on an average road, controlling said pressure control valve in accordance with vehicle speeds, and decreasing oil pump loss, thereby providing appropriate servo capacity to mitigate impacts at the time when a shift is made automatically.

In the automatic transmission having the fluid drive torque converter or a fluid coupling and the speed change gear equipped with the hydraulic servo mechanism, the present invention is concerned with the oil pressure control system, especially the circuit thereof, of which the pressure control valve is provided for controlling oil pressure P*l* to be supplied to the servo mechanism and is controlled by the oil pressure P*l* thus controlled by the pressure control valve and further a change-over valve is provided in the circuit of the oil pressure to be supplied to the pressure control valve for its control, and is so designed as to operate in accordance with the pressure P*go* in proportion to the speed of revolution of an output shaft. By means of this change-over valve, the oil pressure circuit for feeding the oil pressure to the said pressure control valve in accordance with the pressure P*go* produced in proportion to the speed of revolution of the output shaft is connected or blocked.

The oil pressure control system of this invention is designed for use in the fluid type automatic transmission having the torque converter consisting of a pump, a turbine and a stator and a speed change gear, the shift of which is controlled by means of brake bands and clutches.

Figure 1:
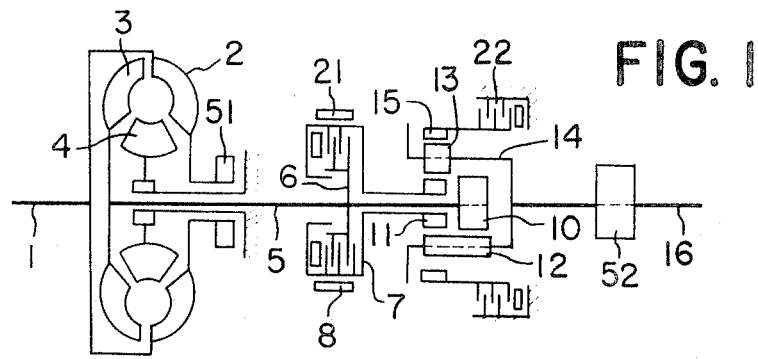
Figure 2:
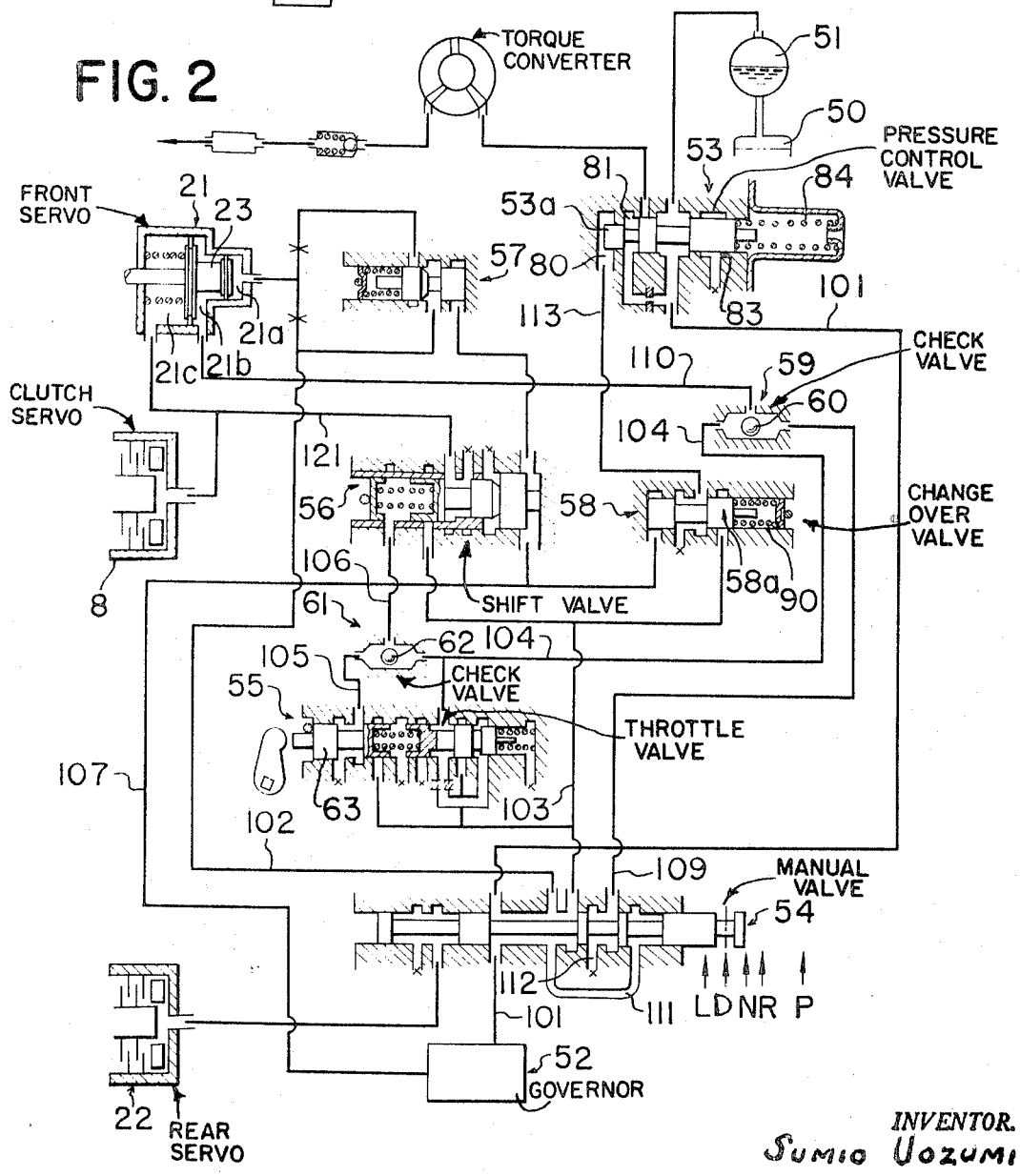

These and other features, objects and advantages of the present invention will become more apparent from the following description when taken in connection with the accompanying drawing which shows, for purpose of illustration, one preferred embodiment in accordance with the present invention, in which:

FIG. 1 is a diagrammatic view showing the principle of an automatic transmission to which an oil pressure control system of this invention is applied; and FIG. 2 is a circuit diagram of an embodiment of an oil pressure control system according to this invention.

Referring to the drawing, and more particularly to FIG. 1 thereof which shows, in one form, the fluid type automatic transmission which provides for two forward speeds and one reverse speed, the torque converter thereof consisting of a pump impeller 2, a turbine runner 3, a stator wheel 4 and an input shaft 5, the pump impeller 2 being directly coupled with an engine crankshaft 1. The engine power is transmitted from the pump impeller 2 to the turbine runner 3 through the fluid. The fluid is then guided by the stator 4 to re-enter the pump impeller 2.

Repeating this fluid circulation within the torque converter, the torque is transmitted as rotational force to the turbine shaft 5. The torque thus transmitted to the turbine shaft is further transmitted to the speed change gear mounted at the rear of the torque converter, which will be described later. As known in a conventional art, by automatically controlling the clutch 8 and the brakes 21 and 22 with a prescribed servo oil pressure, providing, together with a planetary gear set, two forward speeds and one reverse speed transmission. The speed change gear mounted at the rear of the torque converter is as described below. The turbine shaft 5 connected to the turbine runner 3 transmits the torque to the planetary gear set. On the turbine shaft 5 are fitted a hub 6 of the clutch 8 and an input sun gear 10. A low sun gear 11 is integrally mounted on to a clutch drum and disk 7 which is related to the hub 6 through a plurality of clutch plates. Pinions 12 and 13 are mounted by a carrier 14 which forms a unitary body with an output shaft 16. The pinion 12 is engaged with the input sun gear 10 and the pinion 13, while the pinion 13 is meshed with the low sun gear 11, a ring gear 15 and the pinion 12, constituting the planetary gear set. Around the drum of the clutch 8 is installed a brake band of the low brake 21 for the brake. Also between the drum of the ring gear 15 and the transmission case a reverse brake 22 is located. An oil pump 51 is directly connected to the pump impeller 2 and is driven by power from the engine. A governer 52 is driven by means of the output shaft 16.

A detailed explanation of this three speed transmission consisting of the above-mentioned components is as follows:

1st speed: To obtain the first speed, i.e., a low speed, tightening the brake band of the low brake 21 to hold the low sun gear 11 which is integral with the clutch 8 drum against rotation, and the speed of revolution from the turbine shaft 5 is decreased and transmitted to the output shaft 16, a shift being made to the first gear.

2nd speed: To obtain the second speed, i.e., a high speed, operating the clutch 8 so as to make the planetary gear set a unit, and the input shaft 5 is thus connected directly to the output shaft 16, a shift being made to the second gear.

Reverse: Operating the reverse brake 22 to stop the revolution of the ring gear 15, and the rotation from the input shaft 5 is reduced and reversed to be transmitted to the output shaft 16, a shift being made into the reverse gear.

The present invention provides an oil pressure control system employed for use in controlling the servo pressure to be furnished to the said clutch 8 and brakes 21 and 22. FIG. 2 shows, in one form, the circuit diagram of the oil pressure control system of this invention, indicating the condition of drive range (D range). In FIG. 2, the oil is drawn up from a fluid reservoir 50 by the oil pump 51 which is directly driven by the engine through the pump impeller 2 (shown in FIG. 1), and provides a line pressure circuit 101. The oil pressure of this circuit 101 is controlled by the pressure control valve 53 (this oil pressure is called the "line pressure P$l$") and supplied to a governor 52. In the D position (Drive range) of a manual valve 54, this line pressure is supplied also to the circuits 102 and 103. In D range of the manual valve 54, the circuit 103 communicates with the line pressure circuit 101, a throttle valve 55, a shift valve 56 and a change-over valve 58$a$, and in other ranges, the pressure in the circuit 103 is discharged. The throttle valve 55 senses the amount of engine throttle valve opening (not illustrated) as plug displacement, and in the circuit 104 an oil pressure proportional to the displacement or opening is built up. This oil pressure is called the throttle pressure P$th$. Between the circuit 104 and the circuit 105 and the circuit 106 is located a check ball device 61, the ball 62 of which is designed to move leftward to block the circuit 105 when furnishing the throttle pressure P$th$ with the circuit 104 to the circuit 106. In this case, the circuit 105 pressure is being discharged by the throttle valve 55. When the engine throttle valve is opened near the wide-open position, the pressure discharge circuit of the circuit 105 is blocked by a kick down valve portion 63 of the throttle valve, the circuit 105 communicating with the circuit 103, and the ball 62 is pressed rightward by the line pressure P$l$ to block the circuit 104. Thus the line pressure flows into the circuit 106. Meanwhile the vehicle speed is detected by the governor 52 which is driven by the output shaft 16, the governor pressure P$go$ being supplied to the circuit 107. On the left end surface of the valve 58$a$ of the change-over valve 58, acts the governor pressure P$go$ produced in the oil pressure circuit 107 in accordance with the vehicle speed. On the right-hand end surface of the valve 58$a$ is installed a coil spring 90. The valve 58$a$ is controlled by the combination of the force of the coil spring 90 and the governor pressure P$go$, and moves to the right or left. The force of the coil spring has been preset to a prescribed value, and therefore this change-over valve 58 is operated in accordance with the change of the governor pressure P$go$. That is, when the output shaft 16 is rotating at a low speed and the governor pressure P$go$ of the circuit 107 is low, the valve 58$a$ of the change-over valve 58 is pressed toward the left by the force of the coil spring 90, disconnecting the circuit 113 communicating with the left-hand chamber 80 of the pressure control valve 53 from the line pressure circuit 103 in D position of the manual valve 54 and at the same time discharging pressure oil in the circuit 113. When the output shaft 16 speed is increased to a high speed, the governor pressure P$go$ becomes great enough to exceed the prescribed value, overcoming the force of the coil spring 90 to move the valve 58$a$ rightward to block the discharge circuit of the circuit 113 and at the same time to connect the circuit 113 with the circuit 103. Also, the throttle pressure circuit 104 directly communicates with the left-hand chamber of the other check ball device 59, furnishing the throttle pressure P$th$ to the piston chamber 21$b$ of the brake servo 21 via the circuit 110. When the throttle pressure P$th$ is furnished from the circuit 104 to the circuit 110, the ball 60 of the check ball device 59 is pressed to the right to block the circuit 109. The right-hand chamber of the check ball device 59 communicates with the manual valve 54 via the circuit 109 and, in D position of the manual valve, the pressure in the circuit 109 is discharged from the circuit 112.

The shift valve 56 is so designed as to be operated by the throttle pressure P$th$ and the governor pressure P$go$ in order to change over the reduction ratio of the planetary gear set. That is, when the manual valve 54 is in D range, the line pressure P$l$ is supplied also to the oil pressure circuit 102 connecting the manual valve 54 and the servo piston chamber 21$a$ of the brake servo 21, while the throttle pressure P$th$ regulated in accordance with the amount of engine throttle valve opening is supplied to the servo piston chamber 21$b$ of the brake servo 21 via the circuit 104, the check ball device 59 and the circuit 110. The shift valve 56 and the oil pressure chamber 21$c$ of the brake servo 21 and the servo oil pressure chamber of the clutch 8 are connected by the circuit 121. When no oil pressure exists in the circuit 121, the band of the brake 21 is applied, while the clutch is released, thus providing the first speed. When a certain vehicle speed has been reached, the valve 58$a$ of the change-over valve 58 is pushed to the right by means of the governor pressure P$go$, connecting the circuit 103 to the circuit 113 to supply the line pressure P$l$ to the left-hand chamber 80 of the pressure control valve. Therefore, the line pressure P$l$ being exerted in the servo oil pressure chamber 21$a$ of the brake servo 21 decreases by a certain value. When the vehicle speed has reached the value suited to the throttle valve opening, the valve of the shift valve 56 is moved to the left by the governor pressure P$go$, the oil pressure circuit 103 is connected to the oil pressure circuit 121. As a result, the line pressure P$l$ acts on the clutch 8 and at the same time on the release side 21$c$ of the servo piston 23. Thus the brake band of the brake 21 is released and the clutch 8 is operated. In this state, the planetary gear set rotates as a unitary body, the turbine (input) shaft 5 being directly coupled with the output shaft 16 to provide the second speed, i.e. high speed. Reversely, a downshift from the second high speed to a lower speed can be made by removing the oil pressure from the circuit 121. The pressure control valve 53 functions to control the line pressure P$l$ to be furnished to the clutch 8 and brakes 21 and 22. The oil pressure from the oil pump 51 is supplied to the left-hand chamber 81 of the valve 53$a$, while the oil pressure in the right-hand chamber 83 is discharged. The chamber 80 at the extreme left of the valve 53$a$ is connected to the change-over valve 58 via circuit 113 and when the governor pressure P$go$ is increased over a certain value, the line pressure P$l$ is supplied from the circuit 103. At the right-hand end of the valve 53$a$, a coil spring 84 is provided. The valve 53$a$, therefore, is controlled by the oil pressure acting on the left-hand chambers 80 and 81 and the force of the coil spring 84, moving to the right or left to discharge the excess oil for regulating the line pressure P$l$.

In the D position of the manual valve 54, when the vehicle speed is increased to a high speed so that the governor pressure P$go$ is over the prescribed value, the circuits 101, 103 and 113 are connected to one another as previously stated, the line pressure P$l$ being exerted to the chamber 80 at the extreme left of the pressure control valve 53. The line pressure P$l$ is controlled to a smaller definite value at a high vehicle speed in D range, than at a low vehicle speed in D range and at any of L (Low position), N (Neutral position), R (Reverse position) and P (Parking position) because the area on which the oil pressure for moving the pressure control valve 53$a$ to the right against the force of the coil spring 84 acts, is larger by the amount of area of the valve relating with the chamber 80.

According to this invention, a required braking force can be obtained by applying the line pressure P$l$ controlled by the pressure control valve 53 to the brake servo 21 in the aforementioned position and also by applying the throttle pressure P$th$ to the brake servo 21 via a separate circuit in accordance with the engine throttle valve opening. When the application of engine brake is required in case of that the motor vehicle is travelling at a half speed for example, 30–40 m.p.h., the manual valve 54 is shifted to L position (Low range), and engine braking is applied. In this state, however, the engine throttle valve is usually in the fully-closed position; and therefore the throttle pressure P$th$ in the chamber 21$b$ acting on the servo piston 23 of the brake 21 is comparatively low and not enough to apply the engine brake. To overcome this short-coming, when the manual valve 54 is in L position, the circuit 109 communicates with the circuit 111 to which the line pressure $Pl$ is being furnished. In D range, these circuits are disconnected to return the oil pressure of the circuit 109 from the circuit 112 to the oil reservoir 50. Thus in L range, as clearly stated previously, the high line pressure $Pl$ which has been controlled is furnished to the servo piston chamber 21b via the circuits 101, 111, 109 and 110; and therefore the aforementioned engine brake works sufficientlly.

When the manual valve 54 is in R range, a higher line pressure $Pl$ than that in D range is exerted on the reverse brake servo 22 to stop the ring gear 15 rotation, thus the rotation from the input shaft 5 is reversed and reduced and transmitted to the output shaft 16, providing a reverse speed.

When the manual valve 54 is placed in N range, the line pressure $Pl$ circuit 101 is blocked by the manual valve 54 and the oil pressure in the clutch 8 and brakes 21 and 22 is forced out by means of the manual valve 54, releasing all the friction members. Thus there is no drive connection between the input shaft 5 and the output shaft 16.

Also with the manual valve 54 shifted into P range position, the line pressure $Pl$ circuit 101, as the same as in N range, is blocked by the manual valve 54 and the oil pressure in the clutch 8 and brakes 21 and 22 is all discharged by the manual valve, releasing these friction members. Also the output shaft 16 is mechanically locked from turning.

As previously stated, the oil pressure controlled by the pressure control valve and the oil pressure suited for the amount of the engine throttle valve opening is directly furnished to the brake servo mechanism via a separate circuit, thus providing a proper servo capacity in order to mitigate impact at the time when an automatic shift is made and to reduce oil pump loss at high-speed travel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed is:

1. In a fluid type automatic transmission comprising a fluid drive torque converter, a driving shaft, a driven shaft, hydraulically actuated servo means providing a plurality of drive ratios between the driving and driven shafts, hydraulic control means, and a source of fluid for the hydraulic control means, the hydraulic control means including a manually operable valve having a plurality of positions, a governor connected to the driven shaft, the governor being in communication with said source of fluid and acting to produce a variable governor pressure $Pgo$ in response to the rate of rotation of the driven shaft, a pressure control valve for controlling the line pressure $Pl$ to said hydraulically actuated servo means, and a change over valve responsive to the governor pressure $Pgo$ in communication with the governor and in communication with the pressure control valve, the change over valve acting to maintain a substantially constant line pressure $Pl$.

2. In a fluid type automatic transmission according to claim 1, wherein the change over valve comprises a valve member movable within a valve body, the valve member having a spring related thereto to normally urge the valve member in one direction with a force of predetermined value, the governor pressure $Pgo$ acting on the valve member in opposition to the spring, whereby the position of the valve member within the valve body is controlled by the combination of the force of the spring and the governor pressure $Pgo$, the position of the valve member acting to selectively connect and block the flow of fluid between the change over valve and the pressure control valve.

3. In a fluid type automatic transmission according to claim 2 including a throttle valve and a first check valve, the check valve being in communication with the manually operable valve, the throttle valve and the servo means.

4. In a fluid type automatic transmission according to claim 3 including a second check valve and a shift valve, the second check valve being in communication with the throttle valve, the shift valve and the first check valve, the shift valve being in communication with the change over valve and the servo means.

References Cited

UNITED STATES PATENTS

| | | | |
|---|---|---|---|
| 3,167,970 | 2/1965 | Wagner et al. | 74—868 X |
| 3,393,585 | 7/1968 | Pierce, Jr. | 74—869 X |
| 3,507,170 | 4/1970 | Hanzi et al. | 74—869 |

ARTHUR T. McKEON, Primary Examiner